Sept. 5, 1967
E. J. CURRY ETAL
3,339,447
MUSIC TEACHING AID
Filed July 20, 1965
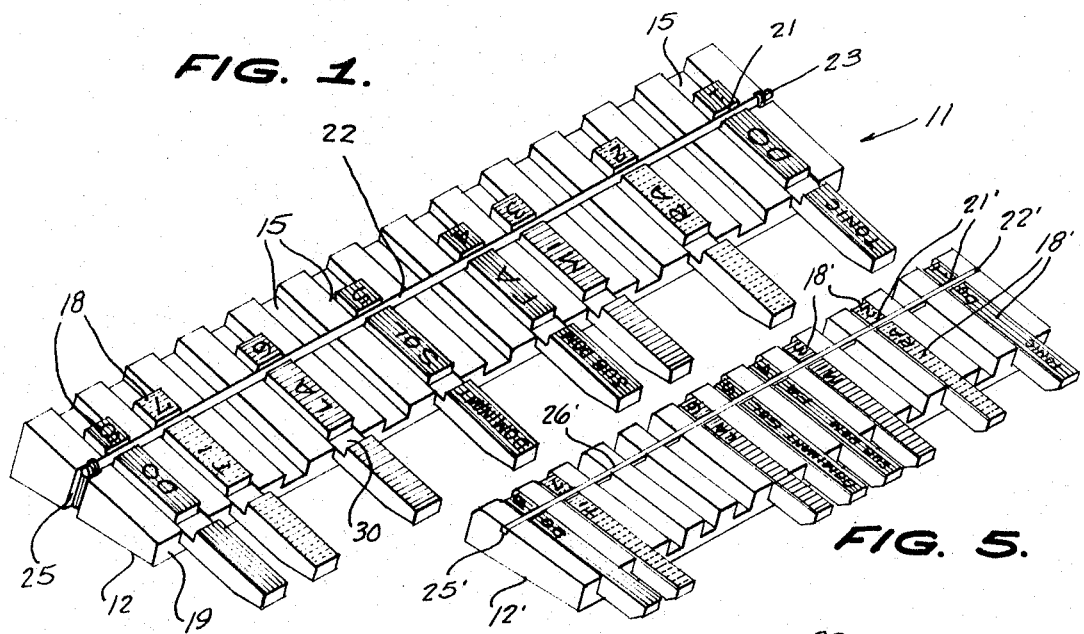
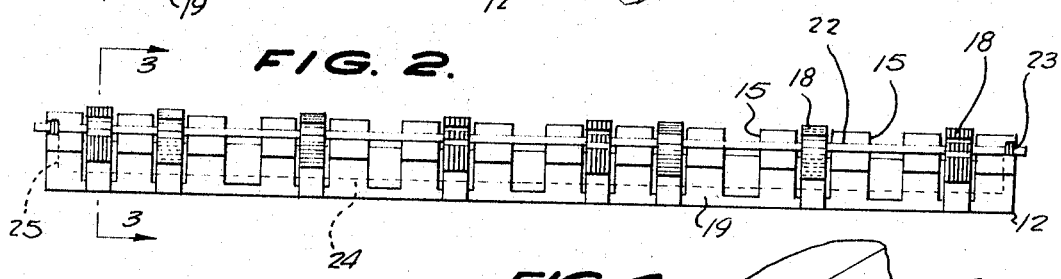
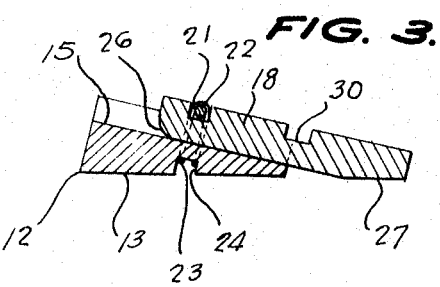
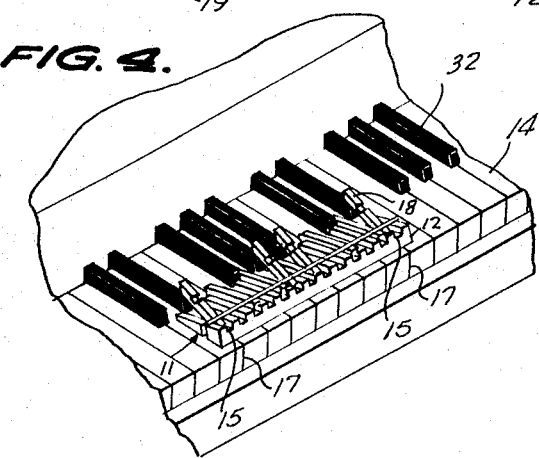
INVENTORS.
ELISHA J. CURRY.
BLANCHE L. CURRY.
BY
*Berman, Davidson & Berman*
ATTORNEYS.

United States Patent Office 3,339,447
Patented Sept. 5, 1967

3,339,447
MUSIC TEACHING AID
Elisha J. Curry and Blanche L. Curry, both of
Rte. 3, Meridian, Idaho 83642
Filed July 20, 1965, Ser. No. 473,425
6 Claims. (Cl. 84—478)

This invention relates to improvements in teaching aids for instructing students learning musical scales, and more particularly to a teaching aid for use in locating the black keys for a scale on a piano-type keyboard.

A main object of the invention is to provide a novel and improved teaching aid adapted to be used in conjunction with a piano-like keyboard for indicating to a student the sharps or flats of a pre-selected scale, the device thus providing a visual indication of the proper scale and indicating the location of the black keys thereon, said device being very simple in construction, being easy to use, being readily adjustable in accordance with the type of scale (major or minor) for which it is to be used, and being of considerable value as a teaching aid by music instructors or as a mechanical teaching aid for self-instruction.

A further object of the invention is to provide an improved scale-teaching aid adapted to be employed with a musical instrument having a piano-like keyboard, the teaching aid being very compact in size, being easy to adjust for the type of scale with which it is to be employed, and serving to locate the black keys for a selected scale in a positive and easily recognizable manner, and being usable on any type of musical instrument provided with a standard piano keyboard.

Further objects and advantages of the invention will become apparent from the following description and claims, and from the accompanying drawing, in which:

FIGURE 1 is a perspective view of an improved musical scale-teaching aid constructed in accordance with the present invention.

FIGURE 2 is an elevational view of the musical scale-teaching device of FIGURE 1, viewed from the front.

FIGURE 3 is a transverse vertical cross-sectional view taken substantially on the line 3—3 of FIGURE 2.

FIGURE 4 is a fragmentary perspective view showing a portion of a piano keyboard on which is mounted a scale-teaching aid device according to the present invention and indicating the manner in which the black keys are located for a particular scale.

FIGURE 5 is a perspective view, to a somewhat reduced scale, of a further and simplified form of musical scale-teaching aid constructed in accordance with the present invention.

Referring to the drawing, 11 generally designates an improved musical scale-teaching aid constructed in accordance with the present invention. The device 11 comprises an elongated supporting body 12 of any suitable rigid material, such as wood, plastic, or the like, the body being generally rectangular in plan and being generally triangular in transverse cross-section, as shown in FIGURE 3, being preferably truncated so that its cross-section is actually trapezoidal, rather than triangular. The body 12 has a substantially flat bottom surface 13 adapted to be placed on a piano keyboard 14 transverse to the white keys thereof, as shown in FIGURE 4. The body 12 is formed with evenly-spaced transverse grooves 15 corresponding in number to the number of semi-tones in an octave and arranged so as to span an octave on the keyboard 14. Thus, in the typical device illustrated in the drawing, there are thirteen evenly-spaced transverse grooves, the end grooves being spaced apart by substantially the same distance provided between corresponding notes in successive octaves on a piano keyboard, for example, the distance between the points 17, 17 in FIGURE 4.

A series of bar members 18 are provided, corresponding in number to the notes in one octave of a conventional musical scale, for example, eight notes, as illustrated, the bar members 18 being receivable in the grooves 15, as illustrated in FIGURE 1, in positions projecting forwardly from the front longitudinal edge 19 of body 12, the bar members being of sufficient length to engage black keys on the keyboard 14 when the device is positioned in the manner shown in FIGURE 4. The bar members 18 are yieldably secured to the body 12 by the provision of transverse grooves 21 in the rear portions of the bar members, said grooves receiving a longitudinally-extending rod 22 arranged over the top surface of the body 12 and resiliently-secured thereto by an elastic band 23 extending through a longitudinal bottom groove 24 provided in body 12 and through end notches 25 provided at the opposite ends of the body, the loops at the opposite ends of the elastic band 23 being engaged over the respective opposite ends of the rod members 22 in the manner illustrated in FIGURE. 1.

As shown in FIGURE 3, the bar members 18 are provided with the rounded rear bottom corners 26 to allow the bar members to be easily pivoted upwardly in their associated grooves 15 when the forward ends of the bar members engage black keys. The bar members 18 are provided at their forward ends with the sloping bottom surfaces 27 to facilitate the engagement of said bar members with black keys.

The bar members 18 are further formed at their intermediate portions with transverse retaining grooves 30 which cooperate with the retaining rod 22 for, at times, holding the bar members in retracted positions on the body 12, for example, when the device is not in use, whereby to reduce the bulk of the device and to facilitate its transportation or storage.

As will be apparent from FIGURE 3, the rod 22 yieldably holds the bar members 18 in the grooves 15 with the bar members projecting forwardly from the front edge 19 of the body 12 and sloping downwardly and forwardly. With the device positioned on a piano keyboard 14 in the manner illustrated in FIGURE 4, certain of the bar members 18 will engage black keys 32 and will be elevated thereby so that they will extend forwardly and upwardly in the manner illustrated in FIGURE 4.

The bar members 18 may be arranged in the grooves 15 in accordance with either the major or minor scale interval arrangement, since it is relatively easy to shift the bar members from one groove 15 to another. FIGURE 1 illustrates the arrangement corresponding to major scale-interval separation. When the device shown in FIGURE 1 is placed on the piano keyboard 14 transverse to the white keys thereof and with the first groove 15 (the groove at the extreme left in FIGURE 4) located over or in alignment with the key note of the scale, the elevated bar members 18 will indicate the black keys, or sharps or flats, of the associated scale. With the arrangement of FIGURE 1, this will give the black keys for any major scale. With the bar members 18 arranged to correspond with the minor scale-interval separation, the device will operate in the same manner to show the black keys for any minor scale.

As shown in FIGURE 1, the bar members 18 may be suitably marked, for example, with numbers to indicate their sequence in an octave, with conventional note designations, and with other data to aid in chord formation. Thus, as shown in FIGURE 1, the first bar member 18 is provided with the numeral "1," with the note designation "Do," and with the marking "tonic" to indicate that it is the basic key note for the selected scale. The other bar members in the series may be similarly marked to provide information of the same general character, useful to the student or instructor in association with the selected scale.

A suitable instruction manual may be provided with the device providing necessary information for adjusting the positions of the bar members 18 in the groove 15 for use with major and minor scales, in the manner above-mentioned.

As will be readily apparent, the device may be employed to indicate to a student the sharps or flats in a pre-selected scale. When the correct sharps or flats in the scale have been thus indicated, the device is removed from the keyboard and the student then proceeds with the lesson, having had a visual indication of the proper scale.

In the form of the invention illustrated in FIGURE 5, the main body 12', is generally similar to main body 12, but the indicating bar members, shown at 18' are provided with transverse grooves, shown at 21', only at their rear portions, said transverse grooves rotatably-receiving the longitudinal rod member 22' which is rigidly-secured in end notches 25' and in intermediate notches 26' provided in body 12'. The body 26' is formed with the transverse grooves 15' movably-receiving the bar members 18' and arranged in the same manner as above-described in connection with FIGURE 1. The bar members 18' have rounded rear bottom corners, similar to the rounded corners 26 shown in FIGURE 3 to enable said bar members to pivot freely in the grooves 15. The bar member 18' can be rotated sufficiently to be disengaged from the rod member 22' at times to permit rearrangement of the bar members, as required.

In both forms of the invention described herein, the eight movable bar members are preferably suitably colored and are divided into three color groups: red for "Do (1)," "Fa (4)," "Sol (5)," and "Do (8);" gray for "Re (2)" and "Ti (7)"; blue for "Mi (3)" and "La (6)." These color indications are desirable and essential to the quick and easy application of the detailed instructions accompanying the device and making the device usable for the entire range of possible chord and scale arrangements. The color coding facilitates the understanding and recognition of notes involved in the various harmonic relationships which can be studied and applied in using the device with the various musical scales.

While a specific embodiment of an improved musical scale-teaching aid device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A musical scale-teaching aid for locating the black keys for a scale on a piano-like keyboard comprising an elongated supporting body adapted to be placed on a keyboard transverse to the white keys thereof, said body being formed with transverse evenly-spaced grooves corresponding in number to the number of semi-tones in an octave and arranged so as to span an octave on the keyboard, a plurality of bar members receivable in said grooves in said positions projecting forwardly from one longitudinal edge of the body sufficiently to engage black keys on the keyboard, the bar members being the same in number as the notes in one octave of a scale, and means to yieldably secure the bar members in said grooves in said forwardly-projecting positions.

2. A musical scale-teaching aid for locating the sharps or flats for a scale on a piano-like keyboard comprising an elongated supporting body adapted to be placed on a keyboard transverse to the white keys thereof, said body being formed with evenly-spaced transverse grooves corresponding in number to the number of semi-tones in an octave and arranged so as to span an octave on the keyboard, a plurality of bar members receivable in said grooves in positions projecting forwardly from one longitudinal edge of the body sufficiently to engage black keys on the keyboard, the bar members being the same in number as the notes in one octave of a scale, said bar members being formed with transverse retaining grooves, and resilient fastening means on the supporting body engageable in said transverse retaining grooves to yieldably secure the bar members in said first-named grooves in said forwardly-projecting positions.

3. A musical scale-teaching aid for locating the sharps or flats for a scale on a piano-like keyboard comprising an elongated supporting body adapted to be placed on a keyboard transverse to the white keys thereof, said body being formed with evenly-spaced transverse grooves corresponding in number to the number of semi-tones in an octave and arranged so as to span an octave on the keyboard, a plurality of bar members receivable in said grooves in positions projecting forwardly from one longitudinal edge of the body sufficiently to engage black keys on the keyboard, the bar members being the same in number as the notes in one octave of a scale, said bar members being formed with transverse retaining grooves, and longitudinal rod means resiliently-secured to the supporting body and engageable in said transverse retaining grooves to yieldably secure the bar members in said first-named grooves in said forwardly-projecting positions.

4. A musical scale-teaching aid for locating the black keys for a scale on a piano-like keyboard comprising an elongated supporting body adapted to be placed on a keyboard transverse to the white keys thereof, said body being formed with evenly-spaced transverse grooves corresponding in number to the number of semi-tones in an octave and arranged so as to span an octave on the keyboard, a plurality of bar members receivable in said grooves in positions projecting forwardly from one longitudinal edge of the body sufficiently to engage black keys on the keyboard, the bar members being the same in number as the notes in one octave of a scale, said bar members being formed with transverse retaining grooves spaced substantially the same distance from the rear ends of the bar members, and longitudinal rod means resiliently secured to the supporting body and engageable in said transverse retaining grooves to yieldably secure the bar members in said first-named grooves in said forwardly-projecting positions.

5. A musical scale-teaching aid for locating the black keys for a scale on a piano-like keyboard comprising an elongated supporting body adapted to be placed on a keyboard transverse to the white keys thereof, said body being formed with evenly-spaced transverse grooves corresponding in number to the number of semi-tones in an octave and arranged so as to span an octave on the keyboard, a plurality of bar members receivable in said grooves in positions projecting forwardly from one longitudinal edge of the body sufficiently to engage black keys on the keyboard, the bar members being the same in number as the notes in one octave of a scale, and means yieldably securing the rear end portions of the bar members in longitudinally-aligned positions in said grooves with the bar members in said forwardly-projecting positions relative to said one longitudinal edge of the supporting body.

6. A musical scale-teaching aid for locating the black keys for a scale on a piano-like keyboard comprising an elongated supporting body adapted to be placed on a keyboard transverse to the white keys thereof, said body being formed with evenly-spaced transverse grooves corresponding in number to the number of semi-tones in an octave and arranged so as to span an octave on the keyboard, a plurality of bar members receivable in said grooves in positions projecting forwardly from one longitudinal edge of the body sufficiently to engage black keys on the keyboard, the bar members being the same in number as the notes in one octave of a scale, said bar members being formed with transverse retaining grooves adjacent to and spaced substantially the same distance from their rear ends, a longitudinal retaining rod received in said bar member-retaining grooves, and resilient means securing the respective ends of the retaining rod to the opposite end portions of the supporting body, whereby to yieldably secure the bar members in said first-named grooves in said forwardly-projecting positions, the bar members being changeable in the first-named grooves to provide numbers of intervals therebetween respectively corresponding to the semi-tone intervals of major and minor scales.

References Cited

UNITED STATES PATENTS 1,347,068   7/1920   Wilder _____ 84—467

RICHARD B. WILKINSON, *Primary Examiner.*

CHARLES M. OVERBEY, *Assistant Examiner.*